Figure 2:
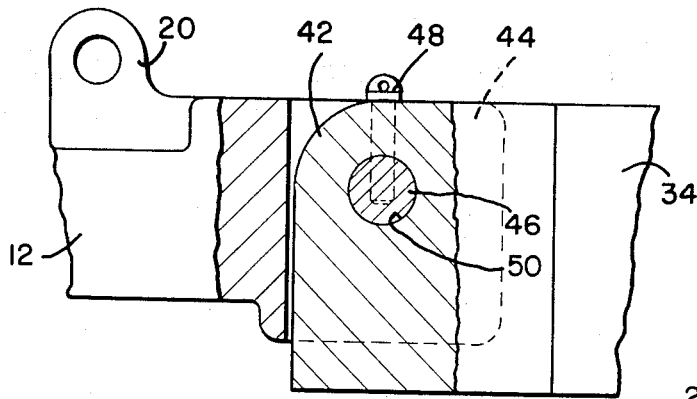

United States Patent [19]
Coyne

[11] 3,771,389
[45] Nov. 13, 1973

[54] MOTORIZED TOOL ASSEMBLY FOR DRILL RODS

[75] Inventor: Francis P. Coyne, Clarksburg, W. Va.

[73] Assignee: Ingersoll-Rand Company, New York, N.Y.

[22] Filed: May 19, 1972

[21] Appl. No.: 255,057

Related U.S. Application Data
[63] Continuation of Ser. No. 79,597, Oct. 9, 1970, abandoned.

[52] U.S. Cl.................. 81/54, 81/57.16, 81/57.34, 173/164, 175/85
[51] Int. Cl....................... B25b 23/00, E21b 19/16
[58] Field of Search.......................... 29/200 D, 240; 81/57.19, 57.2, 57.44, 57.16, 57.34, 54; 173/164; 175/85; 269/55

[56] References Cited
UNITED STATES PATENTS

| | | | |
|---|---|---|---|
| 1,079,396 | 11/1913 | Chapman | 173/164 |
| 1,513,388 | 10/1924 | Greve | 173/164 |
| 2,000,221 | 5/1935 | Dawson | 29/240 UX |
| 2,570,080 | 10/1951 | Stone | 173/164 |
| 3,041,901 | 7/1962 | Knights | 81/57.2 X |

Primary Examiner—Othell M. Simpson
Assistant Examiner—Neil Abrams
Attorney—Frank S. Troidl et al.

[57] ABSTRACT

A fluid-actuable-cylinder-powered, clevis-pivoted, chuck for locking engagement with flatted surfaces of a drill rod shank for holding the drill rod against rotation as another drill rod is coupled thereto or uncoupled therefrom. The clevis and cylinder cooperate to move the chuck away from the drill rod string when not in use. A platform, which has an arcuate slot formed therein, guides the chuck in a rotary arc, during rod rotation, for arresting engagement against one of two spaced-apart bumper blocks fixed to the platform. A stepped shoulder formed in the chuck engages the inside diameter of a centralizer bushing, disposed within the platform, to cooperate with the arcuate slot to slue the chuck about the axial center of the bushing. In rod-uncoupling use, the impacting engagement of the chuck with the bumper block loosens or "breaks out" the coupling of the held rod and the rod coupled thereto.

13 Claims, 2 Drawing Figures

PATENTED NOV 13 1973 3,771,389

INVENTOR
FRANCIS P. COYNE
BY
*Bernard C. Murphy*
AGENT

MOTORIZED TOOL ASSEMBLY FOR DRILL RODS

This is a continuation of application Ser. No. 79,597, filed Oct. 9, 1970 now abandoned.

This invention pertains to drill-rod-handling tools, and in particular to a motorized drill-rod-handling tool for enabling a remote control coupling and uncoupling drill rods.

In the prior art it has been the practice to use a manually held chuck to couple and uncouple drill rods. Accordingly, to use the hand chuck, a drilling machine operator has to leave the machine cab. It is an object of this invention to facilitate the operator's coupling and uncoupling of drill rods while he remains in the cab of the drilling machine. It is another object of this invention to teach a motorized tool assembly for drill rods which have tool receiving surfaces comprising tool means for engaging such surfaces, motor means for moving the tool into and out of engagement with such surfaces, means coupling the tool and motor means together, means for supporting at least one of said tool, motor and coupling means for movement coincident with rotation of the drill rods, and stop means for arresting movement of said one means.

A feature of this invention comprises a fluid-cylinder-powered, clevis-pivoted chuck for locking engagement with flatted surfaces of a drill rod to hold the rod against rotation as another rod is coupled thereto or uncoupled therefrom. The clevis and cylinder move the chuck away from the drill string when not in use. A platform with an arcuate slot guides the chuck in a rotary arc for impacting against a bumper block; the impacting "breaks out" the coupling of the coupled rods. For coupling use, the chuck is rotated against a block to hold the one rod against rotation as another rod is rotatably coupled thereto.

Figure 1:
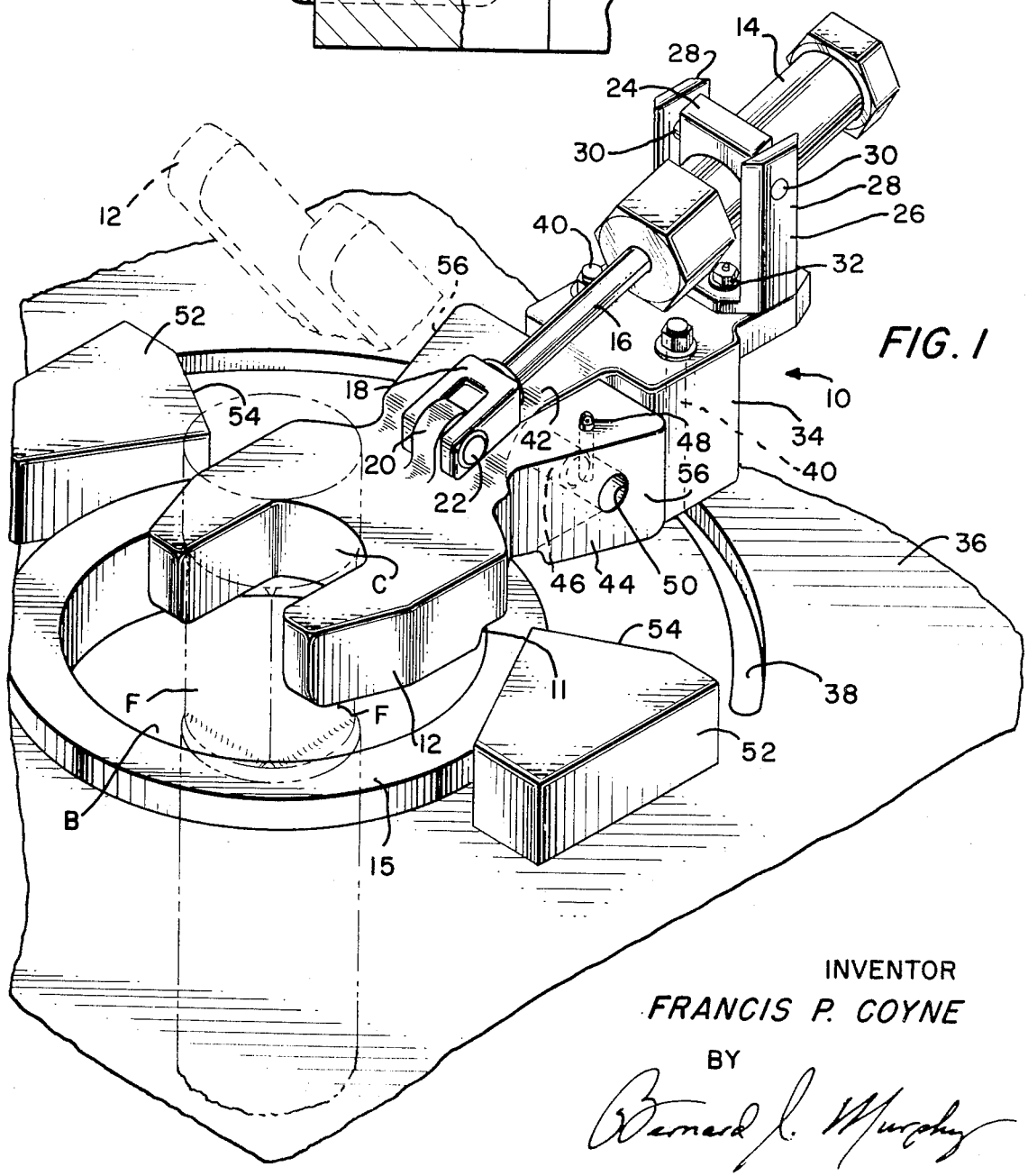

Further objects and features of this invention will become more apparent by reference to the following description, taken in conjunction with the accompanying figures, in which:

FIG. 1 is an isometric projection of an embodiment of the novel tool assembly shown in operative position in full line illustration, and in which the chuck is partly moved away from the drill string in broken-line illustration; a section of drill string is shown in phantom; and FIG. 2 is a side elevation illustration, partly in cross-section, showing a clevis mounting arrangement of the chuck and the fluid-cylinder mounting base.

As shown in the figures, a novel motorized tool assembly 10, according to the invention, comprises a chuck 12 and a fluid-actuable and operated cylinder 14. The cylinder 14 includes a fluid-actuable piston (not shown) which translates a piston rod 16. The piston rod 16 terminates in a yoke 18 which receives a pintle 20 integral with and projecting from chuck 12. The yoke 18 and pintle 20 are rotatably coupled together by means of a clevis pin 22.

The cylinder 14 has a mounting collar 24 thereon which is received in a bracket 26 which has upright members 28. Members 28 receive the collar 24 rotatably therewithin by means of pivot pins 30. Bracket 26 is secured by fasteners 32 to a mounting base 34. Base 34 is slidably supported on a platform 36 which presents a bearing surface for an arcuate slue of mounting base 34 thereupon. Accordingly, chuck 12, cylinder and rod 14 and 16, and the components which operatively couple these together, define a power-tool unit. Platform 36 has an arcuate slot 38 formed therethrough which slot is penetrated by two studs 40, which are fixed in base 34, to facilitate a guidance of base 34 in its slue across platform 36. Thus slot 38 and studs 40 cooperatively comprise an arcuate guide and follower which effect both a freely slidable engagement and a slueing engagement of the power-tool unit with the platform 36. A stepped shoulder 11 formed in the chuck 12 engages the inside diameter 13 of a centralizer bushing 15, disposed within the platform 36, to cooperate with the arcuate slot 38 to slue the chuck about the axial center of the bushing 15. Base 34 has a pintle 42 integral therewith and projecting therefrom which is received in a yoke 44 which is integral with and extends from yoke 12. A clevis pin 46 rotatably secures the pintle 42 and yoke 44 together, the pin 46 being retained in place by means of removable assembly pins 48. Pintle 42 and yoke 44 have, in common, a pin hole 50 which accommodates pin 46, and pins 48 intrude into hole 50, at opposite ends of pin 46. Finally, platform 36 has fixed thereto, adjacent to either ends of slot 38, a pair of bumper blocks 52. Each block presents a stop surface 54 disposed to receive one of the two impacting or bracking surfaces 56 of chuck 12.

In operation, chuck 12 engages flat surfaces F while enveloping the drill rod shown in phantom, the flat surfaces having a collar C thereabove to insure that the rod will not fall into the drill hole B. On uncoupling coupled rods of the drill string, the string is rotated quickly until one of the surfaces 56 slams against a surface 54 of one of the bumper blocks 52 to "break out" the threaded coupling. In coupling operation, a surface 56 is brought to bear against a surface 54 and the drill string is slowly rotated to cause a threaded coupling of a successive drill rod to the drill rod being held by the chuck 12.

When the chuck 12 is not to be used, cylinder 14 is actuated to retract rod 16 to allow the chuck 12 to be withdrawn from envelopment of drill rod. Simultaneously, the drill string is raised slightly to allow chuck 12 to clear the collar C and pivot on pin 46 whereupon it assumes an inoperative position similar to that shown in dotted line illustration. By reversing this procedure, the chuck 12 is disposed in operative position for effecting a locking-engagement thereof with the flat surfaces F of a drill rod.

This novel tool assembly obviates any necessity for the operator of the drilling machine to leave his cab. Coupling and uncoupling of drill rods is readily facilitated by remote control from the cab, or from any selected remote location, by actuation of cylinder 14.

While I have described my invention in connection with a specific embodiment thereof it is to be clearly understood that this is done only by way of example and not as a limitation to the scope of my invention as set forth in the objects thereof and in the accompanying claims.

I claim:

1. A motorized tool assembly, for coupling and uncoupling rotatable drill rods which have tool-receiving flat surfaces, comprising:

tool means for enveloping a drill rod and engaging said flat surfaces and for receiving concentric rotary motion from a drill rod engaged therewith;

motor means for moving said tool means into drill rod envelopment and into engagement with said flat surfaces, and for withdrawing said tool means from drill rod envelopment;

means coupling said tool and motor means together to define a power-tool unit; and means for supporting said unit; wherein said unit and said supporting means have arcuate guide and follower means which cooperatively effect both a freely slidable engagement and a slueing engagement of said unit with said supporting means, to permit drill-rod-imparted slidable and rotary movement of said unit relative to said supporting means upon said tool means being engaged with a rotating drill rod; and stop means, coupled to said supporting means, for arresting slidable and rotary movement of said unit.

2. An assembly, according to claim 1, wherein:
said tool means comprises a chuck.

3. An assembly, according to claim 1, wherein:
said motor means comprises a fluid-actuable cylinder and piston rod assembly.

4. An assembly, according to claim 1, wherein:
said tool means comprises a chuck;
said motor means comprises a fluid-actuable cylinder having a reciprocating piston rod extending therefrom; and
said coupling means comprises first clevis means interconnecting said chuck and said piston rod.

5. An assembly, according to claim 4, wherein:
said coupling means further includes a mounting base; and further including
means securing said cylinder to said base; and
second clevis means interconnecting said chuck and said base.

6. An assembly, according to claim 5, wherein:
said supporting means comprises a bearing surface; and wherein
said base is supportedly disposed upon said bearing surface for slidable movement thereupon.

7. An assembly, according to claim 6, wherein:
said stop means comprises means fixed to said bearing surface, in at least one given location, for arresting movement of said unit thereat.

8. An assembly, according to claim 7, wherein:
said fixed means comprises a bumper block.

9. An assembly, according to claim 6, wherein:
said stop means comprises a pair of bumper blocks fixed to said bearing surface at spaced-apart locations for confining slidable movement of said unit to an area lying between said blocks.

10. An assembly, according to claim 6, wherein:
said arcuate guide and follower means comprises means attaching said base to said bearing surface.

11. An assembly, according to claim 10, wherein:
said attaching means comprises fasteners fixed to said base and in penetration of said bearing surface.

12. An assembly, according to claim 10, wherein:
said attaching means comprises fasteners secured in said base and extending therefrom in penetration of said bearing surface, and an arcuate guide slot formed in said bearing surface, and said fasteners engage said slot.

13. A motorized tool assembly, for coupling and uncoupling rotatable drill rods which have tool-receiving surfaces, comprising:

tool means for engaging said surface;

motor means for moving said tool means into and out of engagement with said surfaces;

means coupling said tool and motor means together;

means for supporting at least one of said tool, motor, and coupling means for movement coincident with rotation of said drill rods;

stop means, coupled to said supporting means, for arresting movement of said one means; wherein said tool means comprises a chuck;

said motor means comprises a fluid-actuable cylinder having a reciprocating piston rod extending therefrom; and said coupling means comprises first clevis means interconnecting said chuck and said piston rod;

said coupling means further includes a mounting base; and further including means securing said cylinder to said base; and second clevis means interconnecting said chuck and said base;

said supporting means comprises a bearing surface; and wherein said base is supportedly disposed upon said bearing surface for slidable movement thereupon;

said supporting means further comprises means attaching said base to said bearing surface;

said attaching means comprises fasteners secured in said base and extending therefrom in penetration of said bearing surface, and wherein said bearing surface has an arcuate guide slot formed therein, and said fasteners engage said slot; and wherein said first clevis means comprises a yoke fixed to a terminal end of said extending piston rod;

a pintle integral with, and projecting from said chuck;

said yoke and said pintle both having clevis pin holes formed therethrough, and a clevis pin in penetration of said pin holes, said stop means comprises a pair of bumper blocks fixed to said bearing surface at spaced-apart locations for confining slidable movement of said chuck to an area lying between said blocks.

* * * * *